US009623940B1

(12) United States Patent
Robichaux, Jr.

(10) Patent No.: US 9,623,940 B1
(45) Date of Patent: *Apr. 18, 2017

(54) ADJUSTABLE GPS/SONAR MOUNT

(71) Applicant: Elmo Robichaux, Jr., Cut Off, LA (US)

(72) Inventor: Elmo Robichaux, Jr., Cut Off, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,499

(22) Filed: Oct. 26, 2015

Related U.S. Application Data

(63) Continuation of application No. 14/187,788, filed on Feb. 24, 2014, now Pat. No. 9,168,982.

(60) Provisional application No. 61/768,207, filed on Feb. 22, 2013.

(51) Int. Cl.
*B63B 49/00* (2006.01)

(52) U.S. Cl.
CPC .................... *B63B 49/00* (2013.01)

(58) Field of Classification Search
CPC .. F16M 11/10; F16M 11/28; F16M 2200/022; F16M 13/022; B63B 25/002; B63B 49/00; B60R 2011/0029
See application file for complete search history.

(56) References Cited

U.S. PATENT DOCUMENTS

| 4,347,013 A * | 8/1982 | Turner | F16M 11/04 248/186.1 |
| 5,303,857 A * | 4/1994 | Hewson | B60R 9/06 224/282 |
| 5,615,620 A * | 4/1997 | Owen | A47B 23/04 108/150 |

(Continued)

OTHER PUBLICATIONS

ParkerMount GPS/Fishfinder Mount http://www.kayalu.com/secure_server/kayalu/parkermount-gps-fishfinder-mount-p-96.html.
(Continued)

*Primary Examiner* — Corey Skurdal
(74) *Attorney, Agent, or Firm* — Garvey, Smith, Nehrbass & North, L.L.C.; Vanessa M. D'Souza; Seth M. Nehrbass

(57) ABSTRACT

The present invention includes a folding and telescoping mounting stand apparatus for mounting a Global Positioning System (GPS)/sonar device on a boat, comprising a first outer tubing attached to a base plate which is secured to a deck of a boat, a first inner tubing having a bottom end and a top end, wherein the bottom end is placed in and attached to the first outer tubing by a pin and a first knob and the top end is placed in and attached to a second outer tubing by an intermediate tubing, a second inner tubing attached to a top tube by a second knob, wherein the combination of the second inner tubing and the top tube are placed in the second outer tubing and held in place with a spring plunger, a board connected to a rod and wherein the rod is secured to the top tube and the second inner tubing with the second knob, wherein the inner tubing is raised to a desired height when the spring plunger is pulled and the board is lifted upward; and the apparatus having an upper body above the first outer tubing that is folded down by releasing the first knob and pulling upward on the board until the upper body is 1" above the first outer tubing and then folding the upper body forward to the deck.

20 Claims, 17 Drawing Sheets

(56) References Cited

U.S. PATENT DOCUMENTS

| | | | | |
|---|---|---|---|---|
| 5,685,107 | A | * | 11/1997 | Sweet .................... A01K 97/10 43/21.2 |
| 5,751,548 | A | * | 5/1998 | Hall ........................ F16C 11/10 248/122.1 |
| 5,769,556 | A | * | 6/1998 | Colley .................... B62H 3/02 24/335 |
| 5,941,434 | A | * | 8/1999 | Green ...................... A45F 5/02 224/195 |
| 5,992,805 | A | | 11/1999 | Tanner |
| 6,019,325 | A | * | 2/2000 | Dotson ................... B63B 49/00 248/121 |
| 6,168,126 | B1 | * | 1/2001 | Stafford ................. B60R 11/02 248/122.1 |
| 6,220,556 | B1 | * | 4/2001 | Sohrt ..................... F16C 11/106 248/278.1 |
| 6,366,313 | B1 | | 4/2002 | Hall |
| D460,078 | S | | 7/2002 | Li |
| 6,585,201 | B1 | | 7/2003 | Reed |
| 7,744,046 | B1 | | 6/2010 | Lundy et al. |
| 7,971,839 | B2 | | 7/2011 | Upchurch |
| 8,166,905 | B2 | | 5/2012 | Gratsch |
| 2008/0216734 | A1 | | 9/2008 | Czipri |
| 2010/0155549 | A1 | * | 6/2010 | Robinson ............... F16M 11/24 248/183.1 |

OTHER PUBLICATIONS

Scotty Fishfinder Mount http://www.scotty.com/fishing-gear-equipment/fishing-supplies/fishfinder-mount.htm.
E Ped Electronics Pedestal http://www.allisonboats.com/content/bass-boats/e-ped/.

* cited by examiner

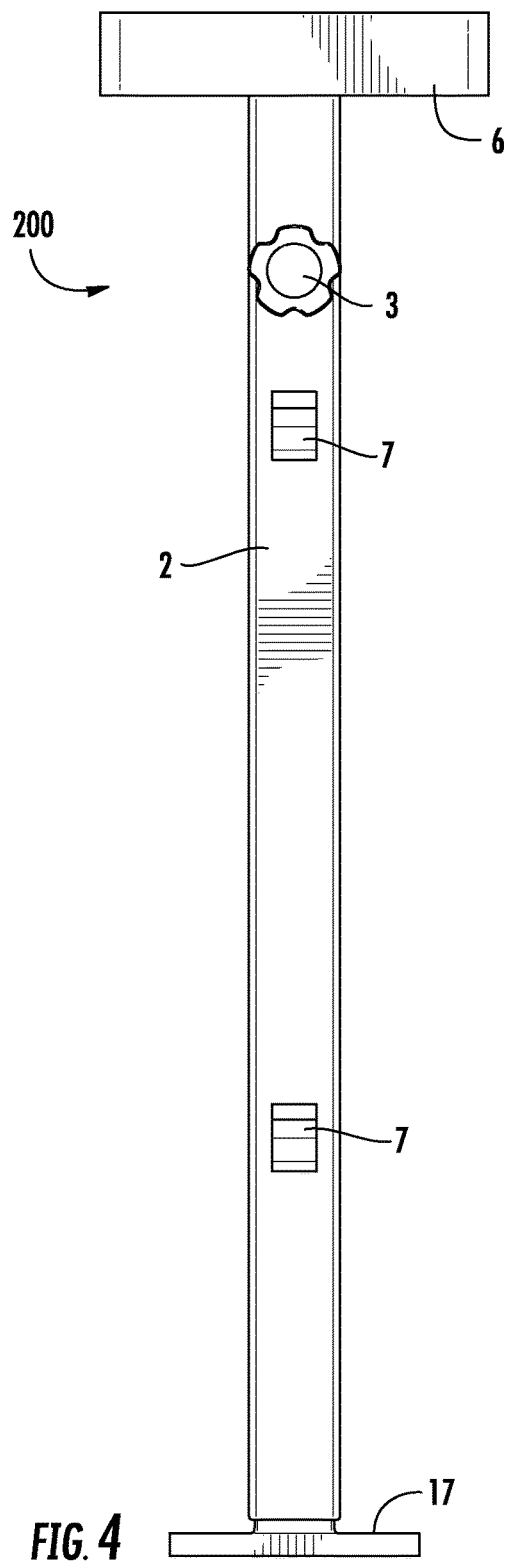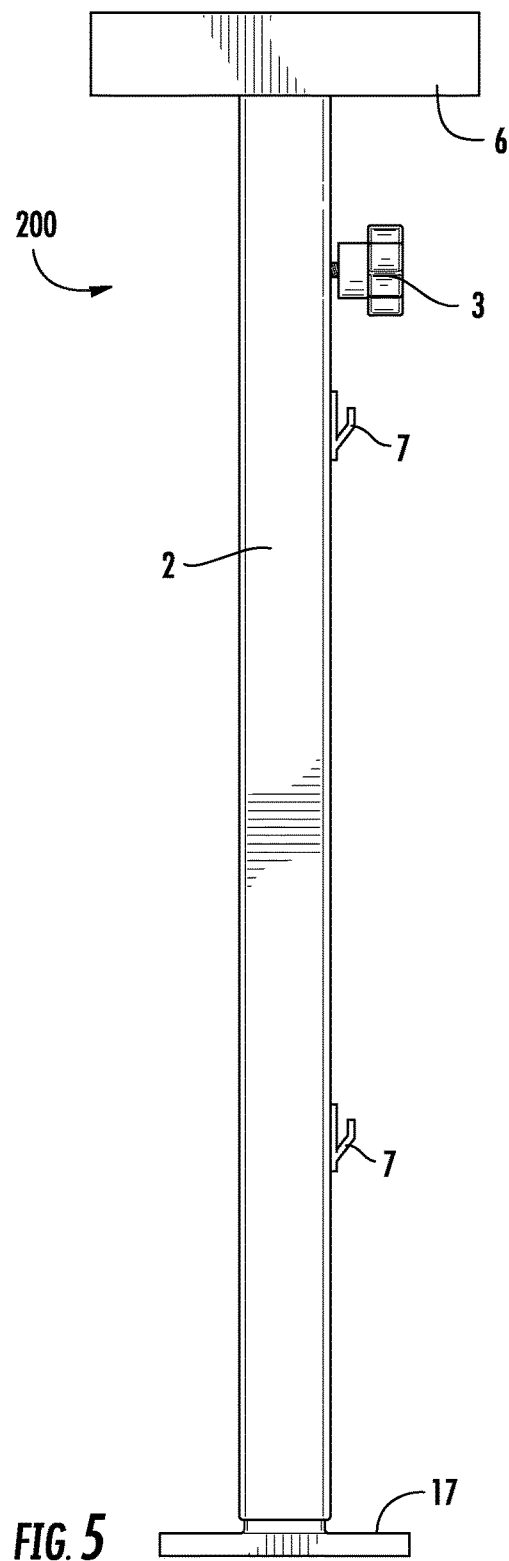

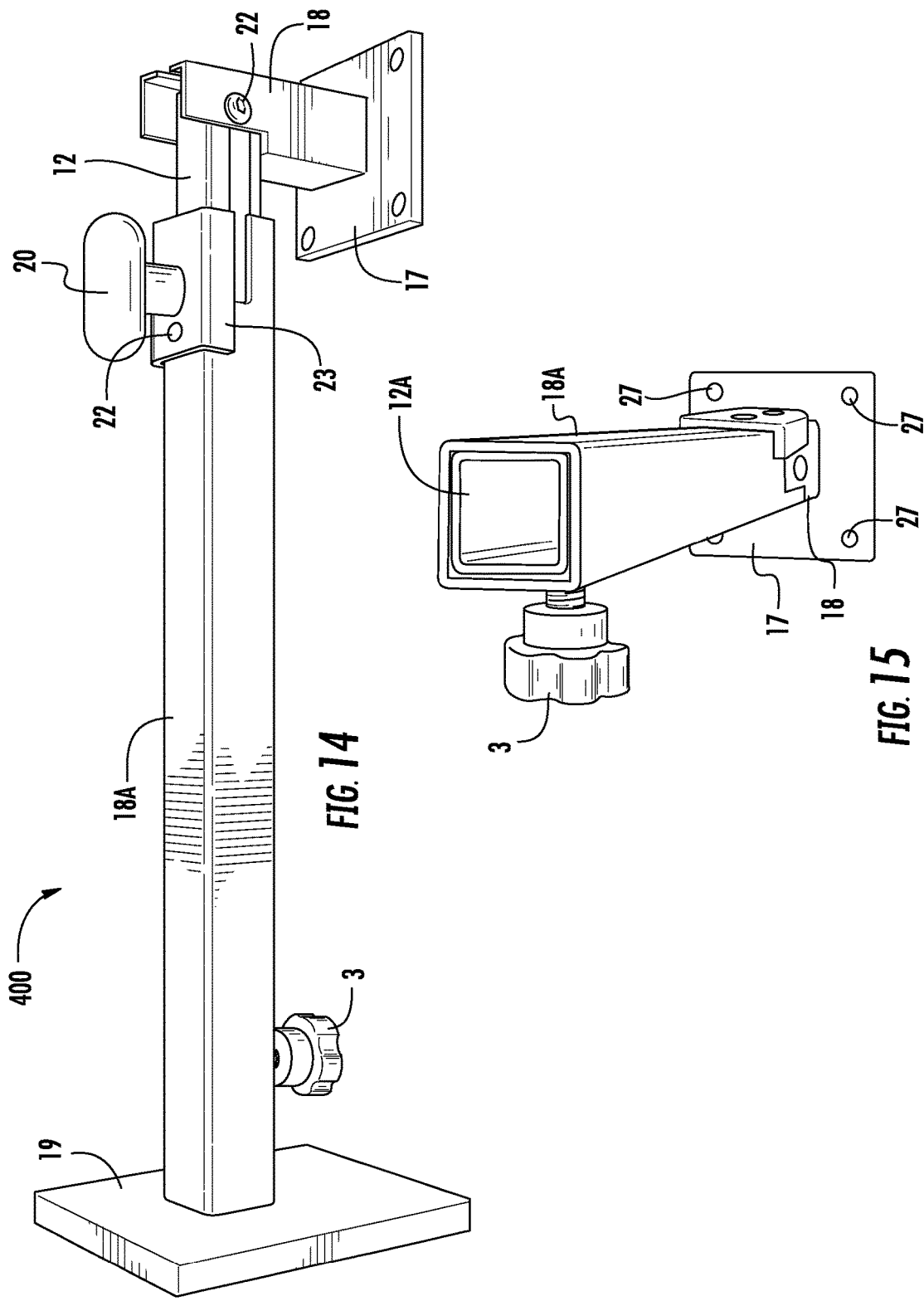

ADJUSTABLE GPS/SONAR MOUNT

CROSS-REFERENCE TO RELATED APPLICATIONS

This is a continuation of U.S. patent application Ser. No. 14/187,788, filed 24 Feb. 2014 (issued as U.S. Pat. No. 9,168,982 on Oct. 27, 2015), which claims benefit of U.S. Provisional Patent Application Ser. No. 61/768,207, filed 22 Feb. 2013.

Priority of U.S. Provisional Patent Application Ser. No. 61/768,207, filed 22 Feb. 2013, hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to a stand or mount to hold a Global Positioning System (GPS)/sonar device on the deck of a boat. More particularly, the present invention relates to a height adjustable stand or mount that can fold down from a vertical position to being generally parallel to the deck of the boat.

2. General Background of the Invention

An existing stand for a GPS/sonar device stands about 6" from the deck. When a fisherman is sitting or standing on the front deck, the stand is about 48" to 60" from the fisherman's view. This distance makes it difficult for the fisherman to see small details and to operate settings on the device. Bending down to make adjustments on the unit can be difficult and unsafe. Bringing the stand closer to the view of the fisherman, such as for example 24 to 30" from view, makes it much easier to read and adjust the GPS/sonar device.

A taller GPS/sonar stand has the advantage of bringing the device closer to the fisherman, making it easier to see. This will also allow a fisherman to buy a smaller GPS/sonar device, thus resulting in a big cost saving. Having the device standing closer to the fisherman also allows for easier and safer operation.

The following table provides an example of possibly relevant US Patents and Publications, which are incorporated herein by reference. The table lists these patents/publications in numerical order, the order of listing otherwise having no significance.

TABLE

| PAT/PUB. NO. | DESCRIPTION | ISSUE/PUB DATE MM/DD/YYYY |
|---|---|---|
| 5,992,805 | Media master apparatus | 11/30/1999 |
| 6,019,325 | Portable depth-finder display support | 02/01/2000 |
| 6,366,313 | Height-adjustable support assembly, particularly suited for food processing equipment | 04/02/2002 |
| D460078 | Supporting frame | 07/09/2002 |
| 6,585,201 | Detachable universal display mount | 07/01/2003 |
| 2008/0216734 | MARINE TELESCOPING GRAB BAR | 09/11/2008 |
| 7,744,046 | Mounting device for electronic fish finder screen | 06/29/2010 |
| 7,971,839 | Equipment mount for waterborne vessels | 07/05/2011 |
| 8,166,905 | Boat accessory mounting apparatus | 05/01/2012 |

Various devices can be seen at the following web sites, which are hereby incorporated herein by reference:

ParkerMount GPS/Fishfinder Mount—http://www.kayalu.com/secure_server/kayalu/parkermount-gps-fishfinder-mount-p-96.html. This is a GPS/fishfinder mount which specifically states that with the integration of a "Toughbar Elbow," one can create additional height or flexibility.

Scotty Fishfinder Mount—http://www.scotty.com/fishing-gear-equipment/fishing-supplies/fishfinder-mount.htm This device can be added with No. 254 Height Extender.

E Ped Electronics Pedestal—http://www.allisonboats.com/content/bass-boats/e-ped/. This device is described as "a telescopic electronics pedestal, elevates the fish-finder to your level of fishing".

BRIEF SUMMARY OF THE INVENTION

The present invention includes a mounting stand apparatus for mounting a Global Positioning System (GPS)/sonar device on a boat, comprising a base plate attached to a deck of a boat, a tube attached to the base plate, and a board connected to a rod, wherein the rod is secured to said tube by a knob, wherein the GPS/sonar unit is secured to the top of the board.

Preferably, the board is connected to the rod by a screw and a washer.

Optionally, the tube is about 3 5/16"-19" in height.
Optionally, the tube is about 9" in height.
Optionally, the tube is about 14" in height.
Optionally, the tube is about 19" in height.
Optionally, the tube is about 3 5/16" in height.
Preferably, the combination of the board and the rod can be removed by releasing the knob.
Preferably, the base plate is secured to the deck of the boat with screw.
Preferably, the board is made of polyethylene plastic.
Preferably, the tube is made of aluminum.
Optionally, the apparatus is about 10" in height.
Optionally, the apparatus is about 15" in height.
Optionally, the apparatus is about 20" in height.
Optionally, the apparatus is about 4" in height.
Preferably, the present invention further comprises multiple electrical ties to hold the wires of the GPS/sonar device.

The present invention includes a telescoping mounting stand apparatus for mounting a Global Positioning System (GPS)/sonar device on a boat, comprising an outer tubing attached to a base plate which is secured to a deck of a boat, an inner tubing having a bottom end and a top end, wherein the bottom end is placed in and secured in the outer tubing and the top end is attached to a top tube by a knob, a board connected to a rod, wherein the rod is secured to said top tube by said knob and wherein the GPS/sonar device is secured to the top of the board, and a pin removably inserted into the inner tube and the outer tube, wherein the inner tube can be raised to a desired height when the pin is removed and be held at the desired height when the pin is inserted into the inner and outer tubes.

Preferably, the pin is attached to the outer tube by a lanyard.

Optionally, the inner tube is about 16½" in height.

Optionally, the outer tube is about 18" in height.

Preferably, the inner tube telescopes from an initial height to the desired height.

Preferably, the apparatus is 20" to 30" in height.

Preferably, the desired height is about 30".

The present invention includes a folding mounting stand apparatus for mounting a Global Positioning System (GPS)/sonar device on a boat, comprising a first outer tubing attached to a base plate which is secured to a deck of a boat, an inner tubing having a bottom end and a top end, wherein the bottom end is placed in and attached to the first outer tubing by a pin and a first knob and the top end is placed in and attached to a second outer tubing by an intermediate tubing, and a board connected to a rod and wherein the rod is secured to said second outer tubing with a second knob and wherein the upper body of the apparatus above the first outer tubing folds down by releasing the first knob and pulling upward on the board until the upper body is 1" above the first outer tubing and then folding the upper body forward to the deck.

Optionally, the present invention can further comprise a flat bar located on the deck at a position under the front side of the board when the apparatus is in a folded position.

Optionally, the present invention can further comprise a first hook and loop fastener located on the front side of the board and a second hook and loop fastener located on the flat bar, wherein the first fastener and second fastener adhere when the apparatus is in a folded position.

Preferably, the apparatus is about 20" in height.

Preferably, the combination of the board and the rod can be removed by releasing the second knob.

The present invention includes a folding and telescoping mounting stand apparatus for mounting a Global Positioning System (GPS)/sonar device on a boat, comprising a first outer tubing attached to a base plate which is secured to a deck of a boat, a first inner tubing having a bottom end and a top end, wherein the bottom end is placed in and attached to the first outer tubing by a pin and a first knob and the top end is placed in and attached to a second outer tubing by an intermediate tubing, a second inner tubing attached to a top tube by a second knob, wherein the combination of the second inner tubing and the top tube are placed in the second outer tubing and held in place with a spring plunger, a board connected to a rod and wherein the rod is secured to the top tube and the second inner tubing with the second knob, wherein the inner tubing is raised to a desired height when the spring plunger is pulled and the board is lifted upward; and the apparatus having an upper body above the first outer tubing that is folded down by releasing the first knob and pulling upward on the board until the upper body is 1" above the first outer tubing and then folding the upper body forward to the deck.

Preferably, the combination of the board and the rod can be removed by releasing the second knob.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 4 shows a front view of a second embodiment of the present invention;

FIG. 5 shows a side view of the second embodiment of the present invention;

FIG. 14 shows a folded view of the fourth embodiment of the present invention;

FIG. 15 shows a top view of the fourth embodiment of the present invention showing the bushing;

DETAILED DESCRIPTION OF THE INVENTION

Figure 1:
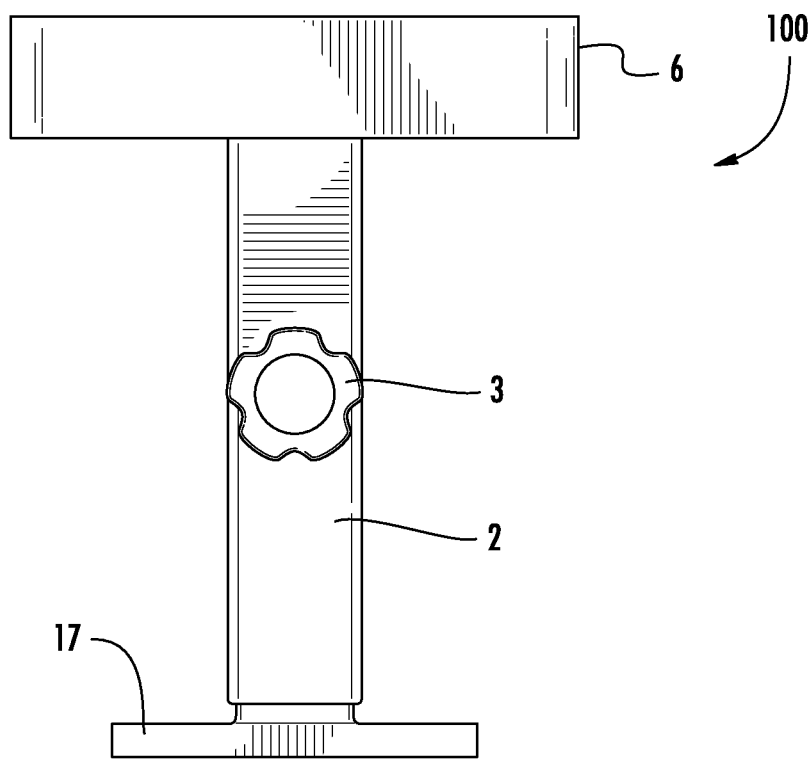
FIG. 1 shows a front view of a first embodiment of the present invention.

Preferred embodiments of the present invention can be seen in FIGS. 1-22. The following description of parts can generally be used in each embodiment disclosed herein:

Base plate 17 can be about 2½"-3½", preferably 2½", long, 2½-3½", preferably 2", wide, and 3/16" in height, and can be made of aluminum or plastic.

Outer tubing 2 can be about 1"-1¼" wide; 1"-1¼" long; 0.075-⅛" thick; and 3 5/16"-19" in height, and can be made of aluminum or plastic. Tubing 2 can be square or round.

Knob 3 (see for example FIGS. 1, 2, 7) can be a studded knob and can have ¼" threads and be about ½" long. Knob 3 can be the same on all embodiments and can be a five-arm knob with ¼"-20×½" threaded stainless steel stud. The diameter can be about 1 3/16".

Screw 4 (see for example FIGS. 3, 10) can be about ¼" wide and 1-1¼" long. Screw 4 can be a pan head machine screw and made of stainless steel.

Lock washer 4A (see for example FIGS. 3, 10) can be ¼" wide, and can be of stainless steel.

Rod 5 (see for example FIGS. 3, 10) can be about ²³⁄₃₂"-¹³⁄₁₆" wide and 2"-3" long, and can be made of aluminum or plastic.

Marine board 6, 19 (see for example FIGS. 3, 22) can be about 3"-3¾", preferably 3¾" wide, 3¾"-8" long, and ¾" in height. Board 6, 19 can be in the shape of a square, rectangle, or have multiple sides, such as a half an octagon, and can be made of polyethylene plastic.

Electrical/cable tie holder 7 (see for example FIGS. 4, 5) can be used on all units when necessary.

Inner tubing 8 can be about ²³⁄₃₂"-1" wide, ²³⁄₃₂"-1" long, 0.075-⅛" thick, and 18" in height, and can be made of aluminum or plastic. Tubing 8 can be square or round.

Release pin 10 (see for example FIGS. 7, 10) can be about ¼" wide and 1¼"-1½" long, and can be of stainless steel. This part can be used on the Sportsman Model which telescopes.

Lanyard 11 can be about 6" long, and can be made of bead chain.

Tubing 12 can be about ³¹⁄₃₂"-1" wide, ³¹⁄₃₂"-1" long, 0.075"-⅛" thick, and 3" in height, and can be made of aluminum or plastic. Tubing 8 can be square or round.

Tubing 12A can be about ³¹⁄₃₂"-1" wide, ³¹⁄₃₂"-1" long, 0.075"-⅛" thick, and 2½"-15¼" in height, and can be made of aluminum or plastic. Tubing 12A can be square or round.

Optionally, hook and loop fastener and flat bar can be used to hold the apparatus to the boat deck. Optionally, a strap system can be used to secure the apparatus to the deck. Hook and loop fastener can be made of Velcro and a flat bar can be about ¾" wide, 5" long, and ⅛" thick.

Plunger 15 (see for example FIGS. 18, 20, 22) can be about ⅜" wide, and can be a short body pull knob plunger, such as a mini index plunger. This part can be used on the Pro Model which telescopes and folds.

Tubing 18 can be about 1¼" wide, 1¼" long, 0.115"-⅛" thick and 3"-3" in height, and can be made of aluminum or plastic. Tubing 18 can be square or round.

Tubing 18A can be about 1¼" wide, 1¼" long, 0.115"-⅛" thick, and 7¼"-17¼", preferably 14", in height, and can be made of aluminum or plastic. Tubing 18A can be square or round.

Tubing 18B can be about 1¼" wide, 1¼" long, 0.115"-⅛" thick, and 2-2½" in height, and can be made of aluminum or plastic. Tubing 18B can be square or round.

Knob 20 (see for example FIGS. 12, 14, 20, 22) can be about ⅜" wide and 1½" long. This part can be used on the Tournament Model which folds, and the Pro Model which telescopes and folds.

Hex nut 21 can be about ⅜" wide and 16" long, and can be made of aluminum. Optionally, this part can be used on the Pro Model which telescopes and folds.

Binding post 22 (see for example FIGS. 14, 16, 20, 22) can be about ¼" wide and 1¼"-1½" long, and can be of stainless steel. This part can be used on the Tournament Model which folds, and the Pro Model which telescopes and folds.

Tubing 23 can be about 1½" wide, ¹⁄₁₆"-½", more preferably ¹⁄₁₆"-⅛", thick, and 2-3" long.

Bolts 24 can be about ½" long. Optionally, this part can be used on the Tournament Model which folds, and the Pro Model which telescopes and folds. Bolts 24 can be stainless steel.

Bar 25 can be about 1¼" wide, 1½" long, and ⅛" thick, and can be made of aluminum.

Lock washer 26 can be about ⅜" long and includes a screw with an internal washer attached.

Quick-release button connector 27 can be used to hold telescoping pieces to tubing together. The button can be about ¼" diameter and ¼" height, with the leg length being about 1½".

Hole 30 in rod 5 can have ¼" threads and can be 1" long.

Washer 31 can be a split lock washer and can fit a ¼" screw.

Base tubing 32 can be 1¼" wide, 1¼" long, 0.115"-⅛" thick, and 2"-2½" in height, and can be made of aluminum or plastic. Tubing 32 can be square or round.

Hole 36 can be can be ½" countersunk and ⅜" deep in board 6.

I. Console Unit

Figure 2:
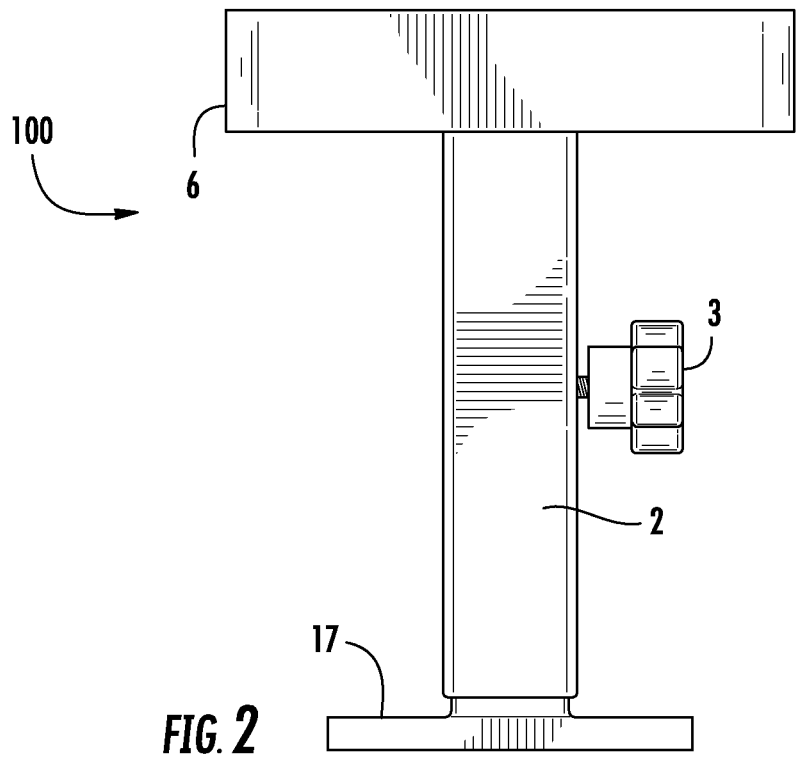
FIG. 2 shows a side view of the first embodiment of the present invention.
Figure 3:
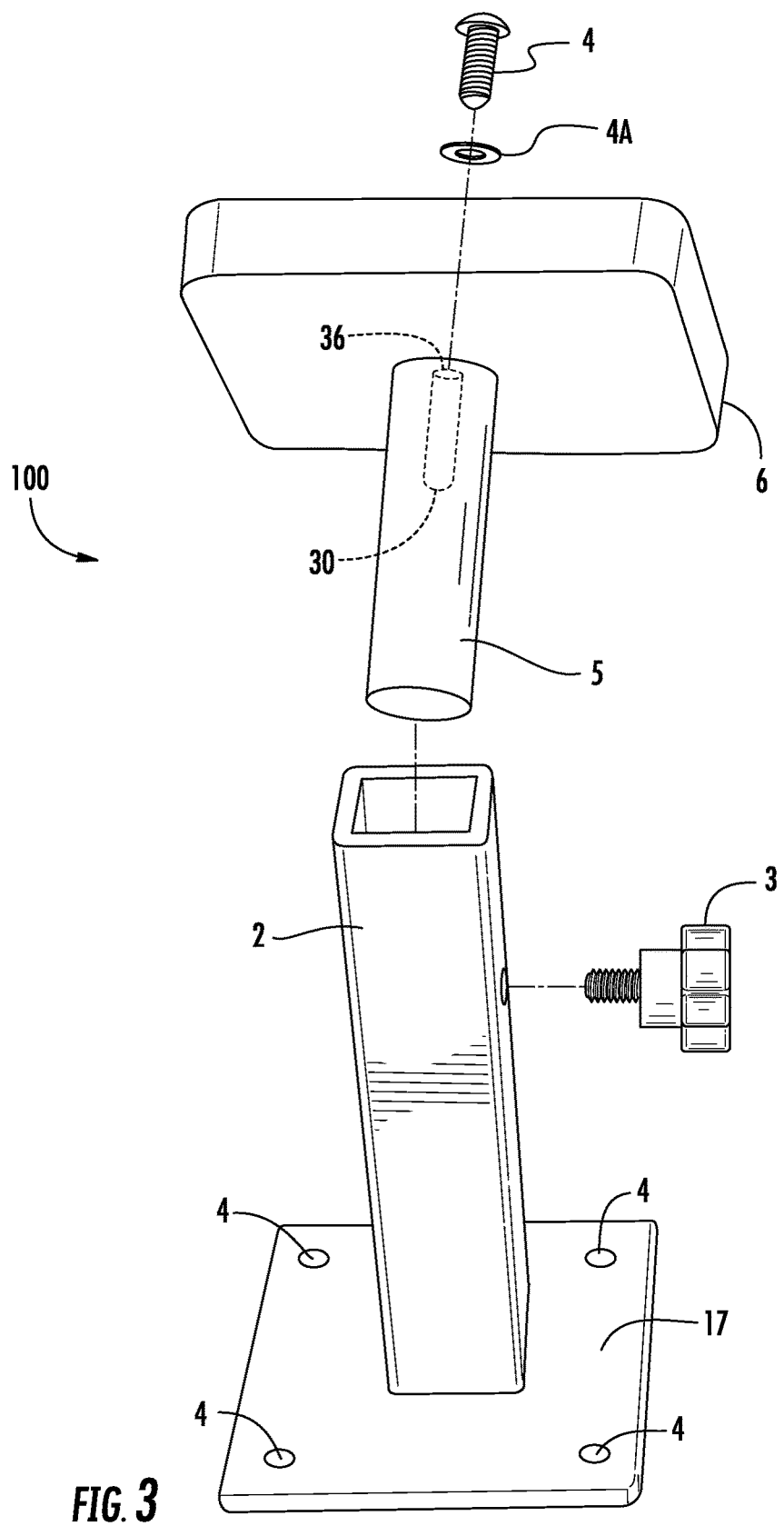
FIG. 3 shows an exploded view of the first embodiment of the present invention.

A first embodiment 100 of the present invention is seen in FIGS. 1-3 and discloses a small compact stand on which the top portion rotates 360 degrees and can be set from the right or left and can be easily removed to use on one of the bow units.

Console model 100 can be about 4" in height from the boat deck. Plate 17 can preferably be 2½" wide, 2½" long, and ³⁄₁₆" thick. Tubing 2 can preferably be 1" wide and 1" long (a 1"×1" square), 0.075"-⅛", preferably 0.075", thick; and 3⁵⁄₁₆" in height. Knob 3 can preferably be a studded knob and can preferably have ¼" threads and can be ½" long. Screws 4 can preferably be ¼" wide and 1" long. Washer 4A can preferably be ¼" wide. Rod 5 can preferably be ²³⁄₃₂"-¹³⁄₁₆", preferably ¹³⁄₁₆", wide and 2"-3", preferably 3", long. Hole 30 can extend about 1" long and about ¼" wide in rod 5. Marine board 6 can preferably be 3¾" wide, 3¾" long, and ¾" in height. Marine board 6 can have hole 36 in the middle of the board 6 so that screw 4 and washer 4A can be secured in hole 30 of rod 5 to connect the board 6 to rod 5.

Assembly of Console Model

1. Plate 17 can be welded or attached to tubing 2.
2. Rod 5 can be attached to marine board 6 by securing screw 4 and washer 4A in hole 30 of rod 5 and in hole 36 of board 6.
3. The combination of the marine board 6, rod 5, screw 4 and washer 4A (which will hold the GPS/sonar unit) can fit into tubing 2 and held in place in tubing 2 with knob 3 (see FIG. 3).
4. The above combination can fit on all embodiments disclosed herein and can rotate 360 degrees to allow the combination to be removed easily and placed on another stand on the bow or for storage.
5. Plate 17 can be attached to a boat deck with screws 4 or by welding.
6. A GPS/Sonar unit can be attached to marine board 6 with screws 4 or by another securing means.

II. Fisherman Model—10"-15"-20" Models

Figure 6:
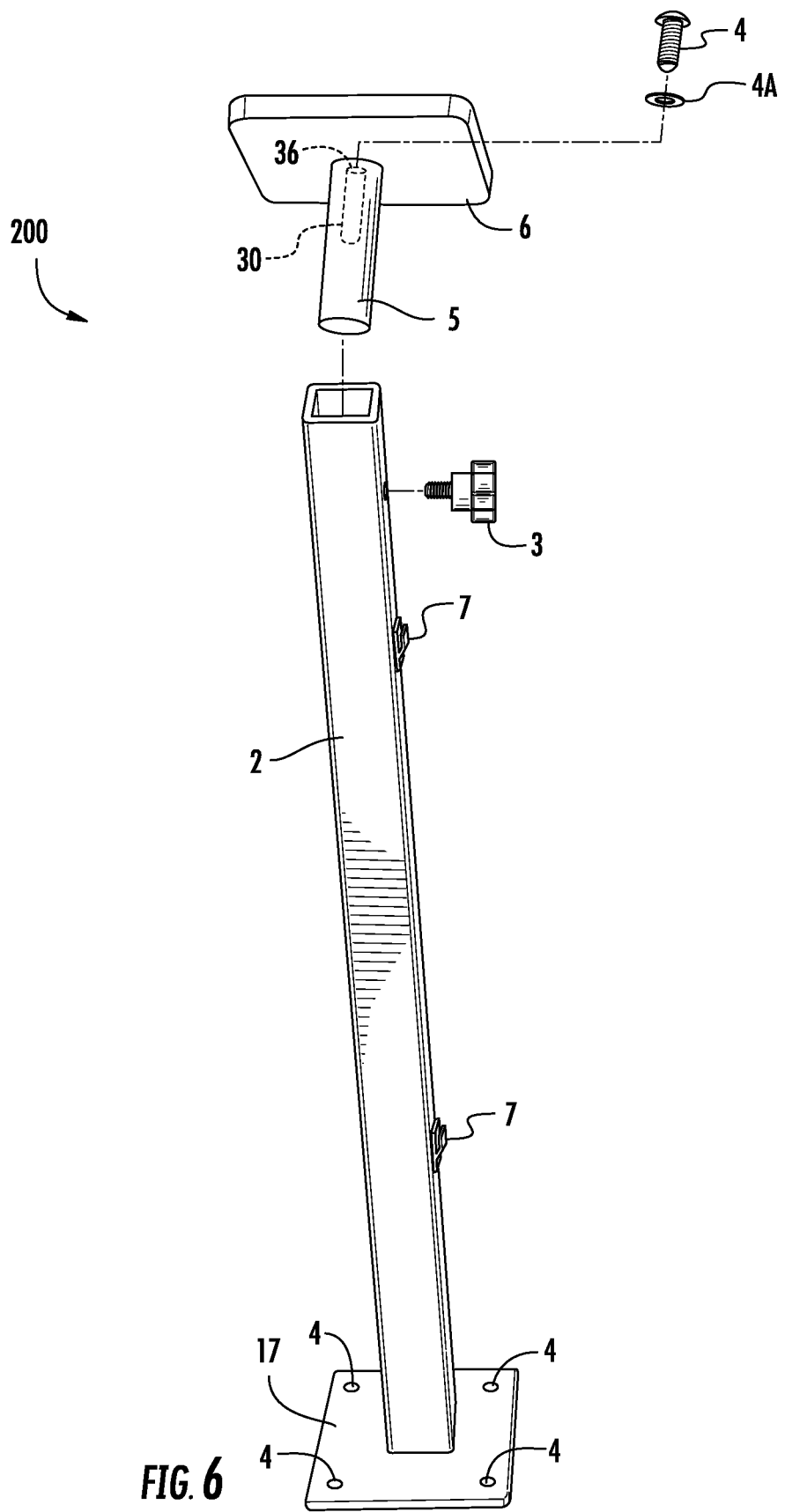
FIG. 6 shows an exploded view of the second embodiment of the present invention.
Figure 7:
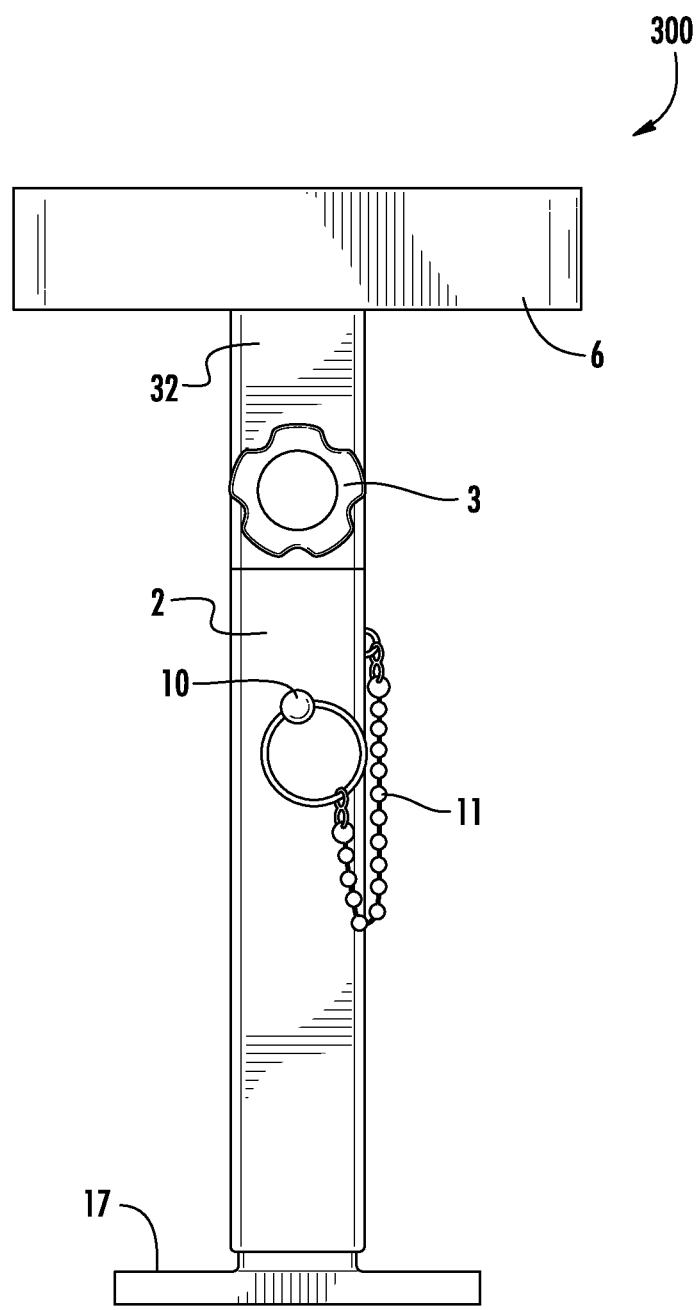
FIG. 7 shows a front view of a third embodiment of the present invention.
Figure 8:
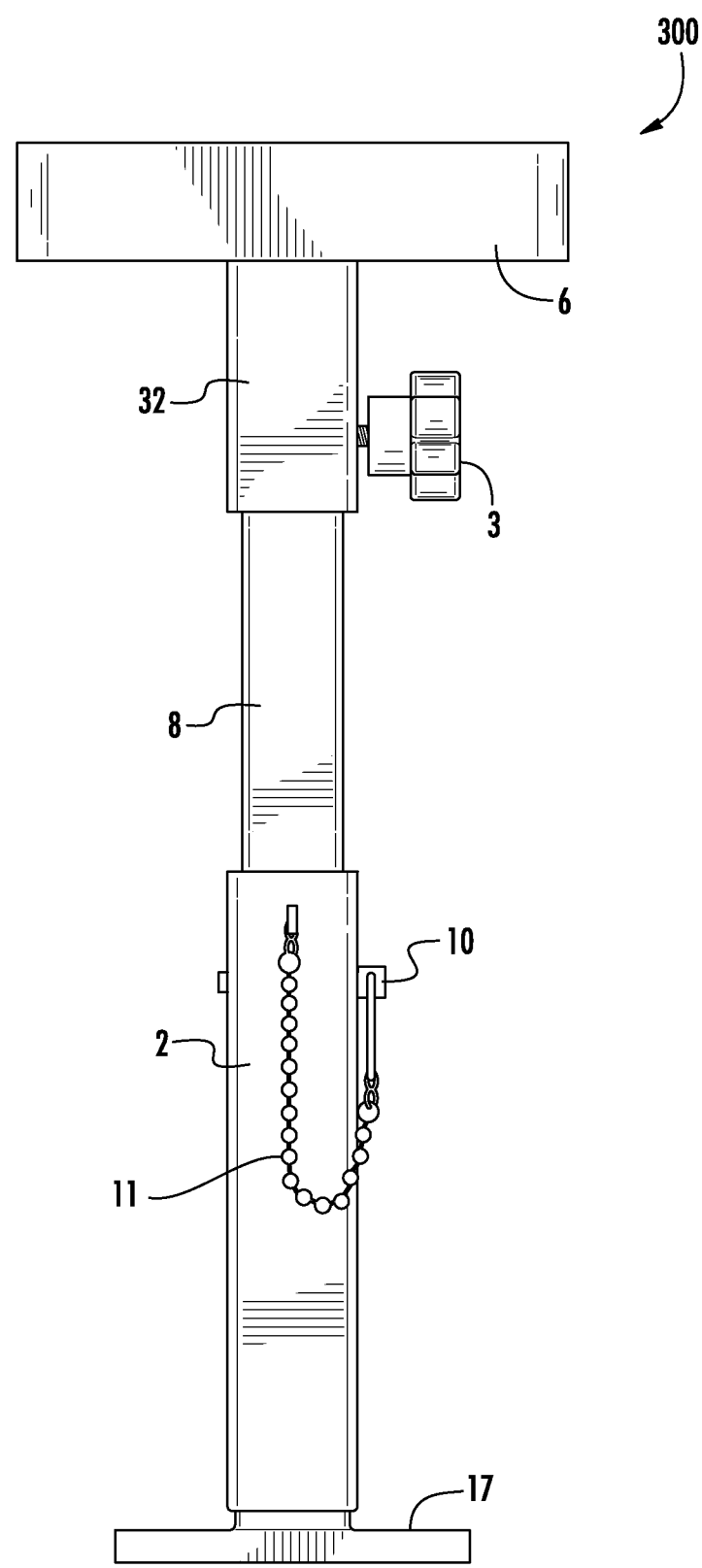
FIG. 8 shows a side view of the third embodiment of the present invention in a raised position.
Figure 9:
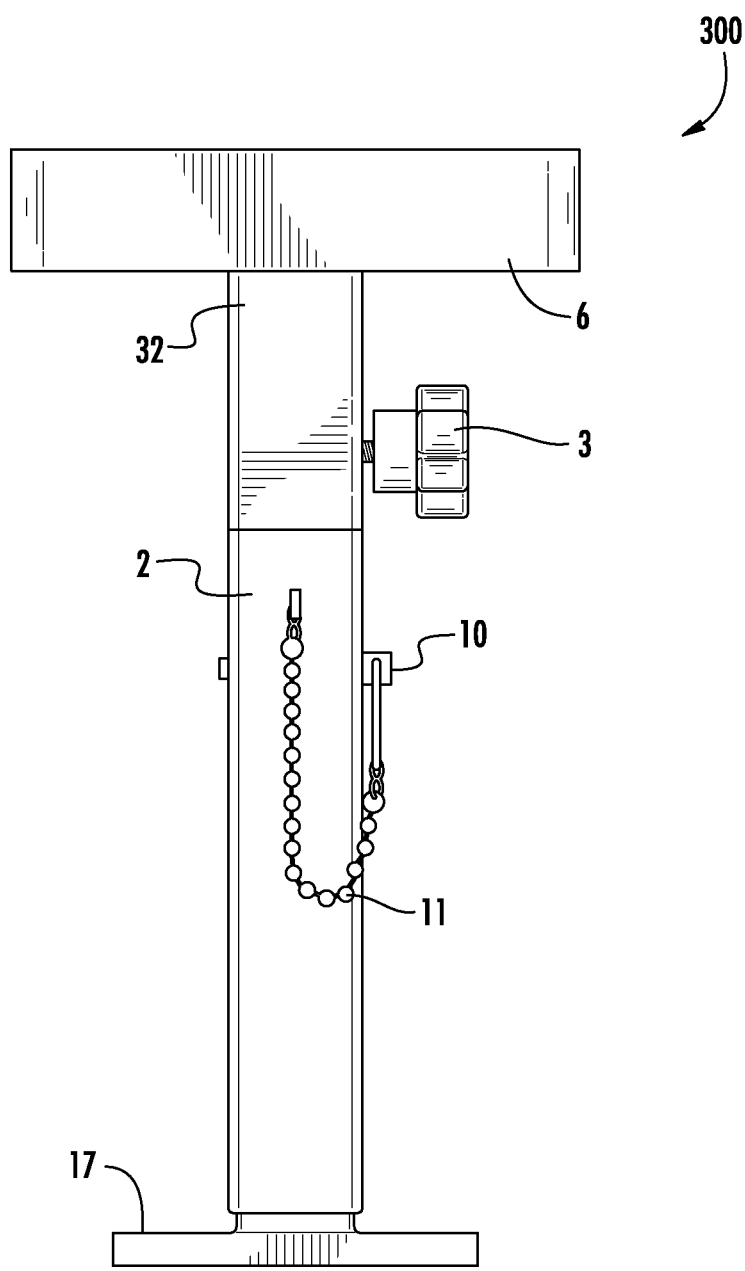
FIG. 9 shows a side view of the third embodiment of the present invention.
Figure 10:
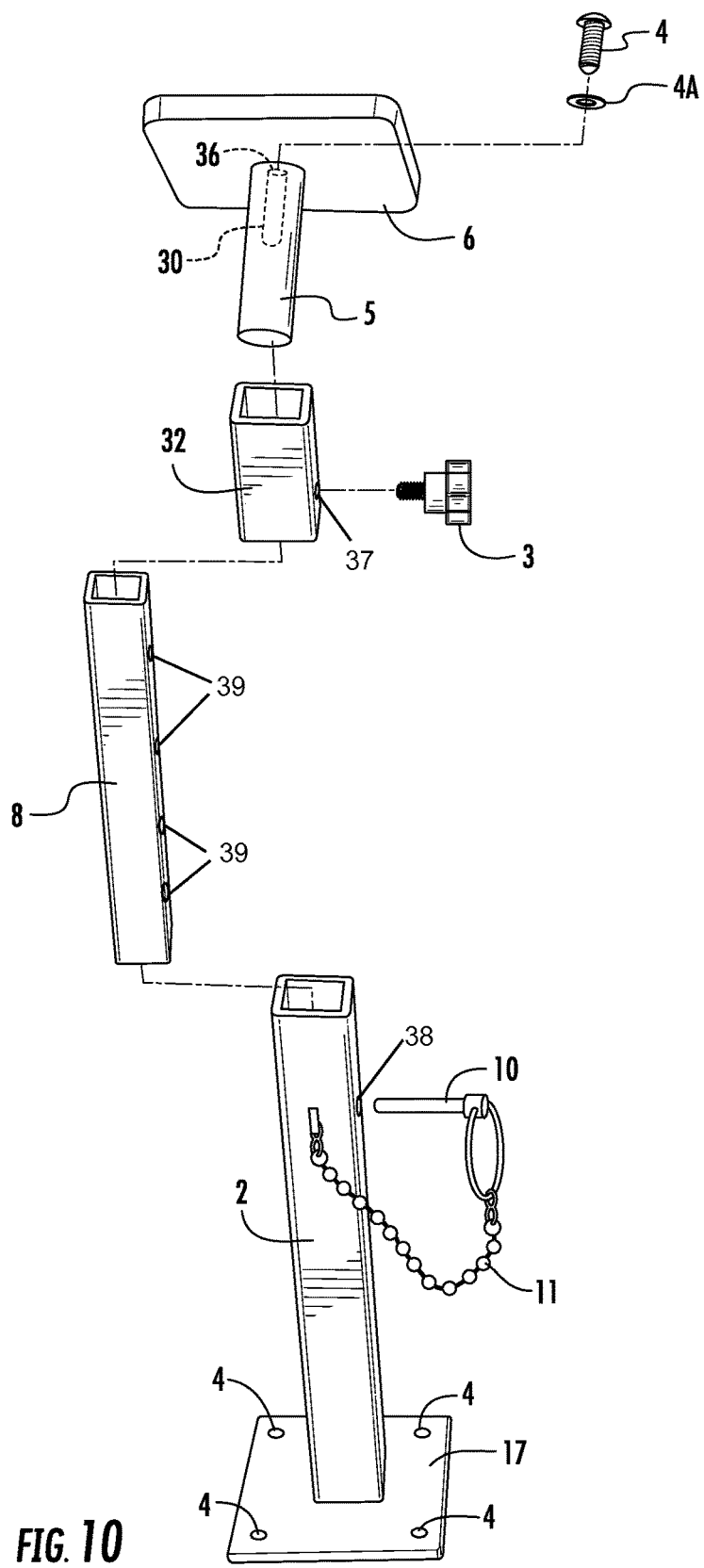
FIG. 10 shows an exploded view of the third embodiment of the present invention.
Figure 11:
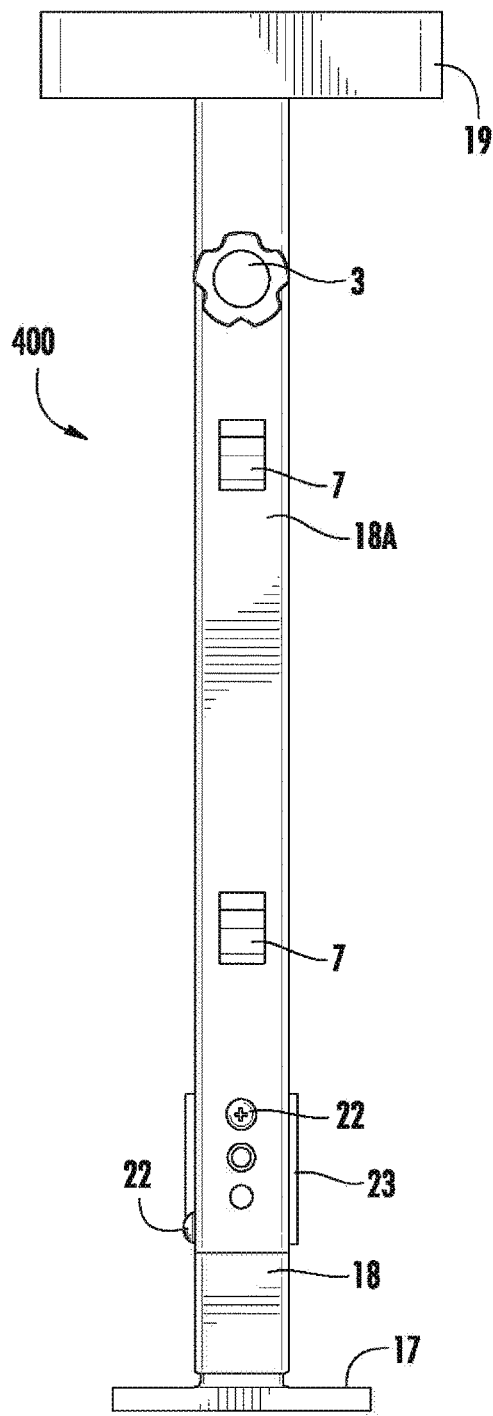
FIG. 11 shows a front view of a fourth embodiment of the present invention.
Figure 12:
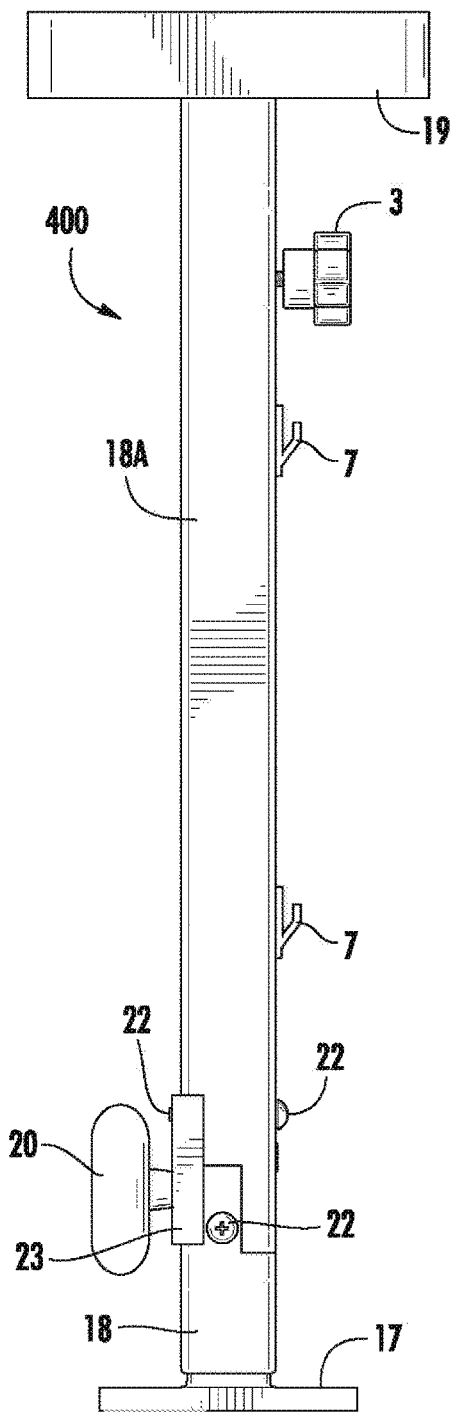
FIG. 12 shows a side view of the fourth embodiment of the present invention.
Figure 13:
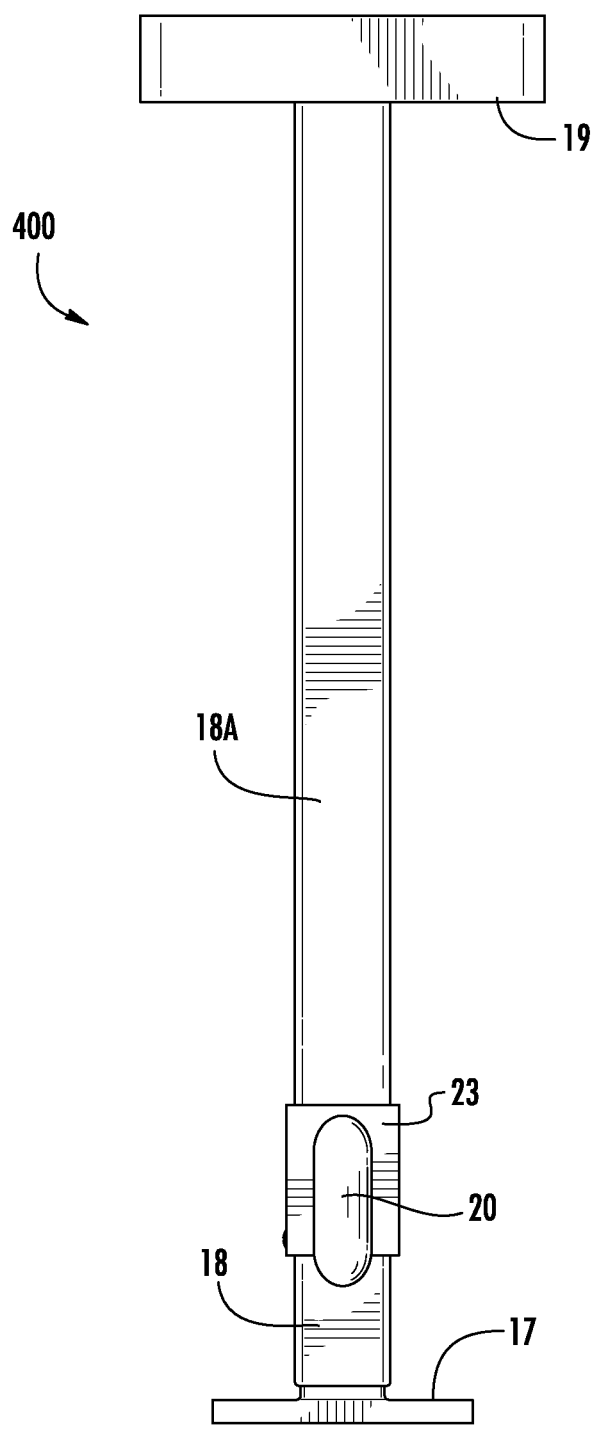
FIG. 13 shows a back view of the fourth embodiment of the present invention.

A second embodiment 200 of the present invention is seen in FIGS. 4-6 and discloses a marine board 6 that can be easily mounted to a stand with screws and rotates 360 degrees with a knob 3 and can be removed easily for storage.

Stand 200 can optionally be 10", 15" or 20" in height. Tubing 2 for the 10" model can be 1" wide and 1" long (1"×1" square), 0.075"-⅛ inch, preferably 0.075", thick, and 9" in height. Tubing 2 for the 15" model can be 1" wide, 1" long, 0.075"-⅛ inch thick, and 14" in height. Tubing 2 for the 20" model can be 1" wide, 1" long, ⅛ inch thick, and 19" in height.

Plate 17 can preferably be 2½"-3", preferably 2½", long, 2½"-3", preferably 2½", wide, and ³⁄₁₆ inches in height. Knob 3 can preferably be a studded knob and can preferably have ¼" threads and be ½" long. Marine board 6 can preferably be 3¾" wide, 3¾" long and ¾" in height. Marine board 6 can have hole 36 in the middle of the board 6 so that screw 4 and washer 4A can connect the board 6 to rod 5. Screws 4 can preferably be ¼" wide and 1" long. Washer 4A can preferably be ¼" wide. Rod 5 can preferably be ²³⁄₃₂"-¹³⁄₁₆", preferably ¹³⁄₁₆", wide and 2"-3", preferably 3", long.

Assembly of Fisherman Model

1. Plate 17 can be welded or attached to tubing 2.
2. Rod 5 with hole 30 can be attached to marine board 6 with screw 4 and washer 4A.
3. The combination of the marine board 6, rod 5, screw 4 and washer 4A (which will hold the GPS/sonar unit) can fit into tubing 2 and held in place in tubing 2 with knob 3 (see FIG. 6).
4. The above combination can fit on all embodiments disclosed herein and can rotate 360 degrees to allow the combination to be removed easily and placed on another stand on the bow or for storage.
5. Plate 17 can be attached to a boat deck with screws 4 or by welding.
6. The GPS/Sonar unit can be attached to marine board 6 with screws 4 and can rotate 360 degrees and can be locked into place with knob 3 which can be located in tubing 2 in a ¼" hole.
7. Electrical ties 7 to hold the GPS/sonar device wires can be included on tubing 2. The electrical ties 7 can be included on any embodiment disclosed herein.

III. Sportsman Model—20" Sportsman Telescopic

A third embodiment 300 of the present invention is seen in FIGS. 7-10 and discloses a stand that telescopes from 20" to 30". Marine board 6 can be mounted to a stand with screws and rotates 360 degrees with a knob 3 to remove easily for storage.

Stand 300 can stand 20" from the deck and can telescope to 30" from the deck. Base tubing 32 can have a ¼" hole 37 in both sides to receive knob 3. Tubing 2 can have a ⁹⁄₃₂" hole 38 in both sides to receive release pin 10.

Outer tubing 2 can preferably be 1¼" wide and 1¼" long (1¼"×1¼" square), 0.115"-⅛", preferably 0.115", thick, and 16½-17" in height. Inner tubing 8 can preferably be ²³⁄₃₂-1", preferably 1", wide, ²³⁄₃₂-1", preferably 1", long, 0.075"-⅛", preferably 0.075", thick, and 18" in height. Plate 17 can preferably be 2½"-3", preferably 2½", wide, 2½"-3", preferably 2½", long, and ³⁄₁₆" in height/thickness. Base tubing 32 can preferably be 1¼" wide, 1¼" long, 0.115"-⅛", preferably 0.115", thick, and 2" in height. Knob 3 can preferably be a studded knob and can preferably have ¼" threads and can be ½" long. Release pin 10 can preferably be ¼" wide and 1½" long, and can be attached to tubing 2 by lanyard 11. Lanyard 11 can preferably be 6" long. Tubing 8 has multiple holes 39 in which release pin 10 can be inserted to raise and lower the stand 300. Rod 5 can preferably be ²³⁄₃₂"-¹³⁄₁₆", preferably ¹³⁄₁₆", wide and 2"-3", preferably 3", long. Hole 30 is located in rod 5 and can preferably have ¼ threads and be 1" long. Marine board 6 can preferably be 3¾" wide, 3¾" long and ¾" in height. Marine board 6 can have hole 36 in the middle of the board (see FIG. 10) so that screw 4 and washer 4A can connect the board 6 to rod 5. Hole 36 can be ½" countersunk and ⅜" deep in board 6. Screw 4 can preferably be ¼" wide and 1" long, and can be a pan head machine screw. Washer 4A can preferably be ¼" wide and can be adjoined with screw 4.

Assembly of Sportsman Model

1. Plate 17 can be welded or attached to tubing 2 (Assembly 1).
2. Tubing 8 can be attached to base tubing 32 by knob 3, which in inserted in holes 37, 39 (Assembly 2).
3. Marine board 6 can be attached to rod 5 with screw 4 and washer 4A in hole 36 (Assembly 3).
4. Assembly 1 can be attached to a boat deck with screws 4.
5. Assembly 2 can be put into Assembly 1 and held in place with release pin 10 by being placed in one of the holes 39 in tubing 8.
6. Assembly 3 can be put in Assembly 2 and can rotate 360 degrees and held in place with knob 3.
7. The GPS/sonar unit can be attached to the top of marine board 6 disclosed in Assembly 3.
8. Electrical ties 7 can be used to hold the GPS/sonar device wires on tubing 2.

Operation of Sportsman Model

Stand 300 will telescope by pulling release pin 10 and pulling up on the GPS/sonar unit and marine board 6 and tubing 8. The stand 300 can be adjusted every 2" from 20" to 30", and can be held at a desired height by inserting release pin 10 into side of tubing 2 and tubing 8. Marine board 6 can rotate 360 degrees and be held in a desired position by knob 3, and can be easily removed for storage by releasing knob 3.

IV. Tournament Model

A fourth embodiment 400 of the present invention is seen in FIGS. 11-16. Stand 400 can fold down to 5" in height on the deck of a boat during nonuse or high speed traveling. Marine board 19 can be easily mounted to the stand with screws, rotates 360 degrees with knob 3 and can be easily removed for storage.

Stand 400 can be 10"-20", preferably 17¾", in height. Tubing 18A can be 1¼" wide, 1¼" long, 0.117-⅛ inch thick, and 7¼"-14½", preferably 14½", in height.

Knob 3 can preferably be a studded, five-arm knob and can preferably have ¼" threads and can be ½" long. Rod 5 can preferably be ²³⁄₃₂"-¹³⁄₁₆", preferably ¹³⁄₁₆", wide and 2"-3", preferably 3", long. Hole 30 is located in rod 5 and can preferably be ¼ wide and 1" deep.

Screw 4 can preferably be ¼" wide and 1" long, and can be a pan head machine screw. Washer 31 can preferably be ¼" wide and can be adjoined with screw 4 and used to attach board 19 to rod 5. Washer 31 can be a split lock washer.

Figure 16:
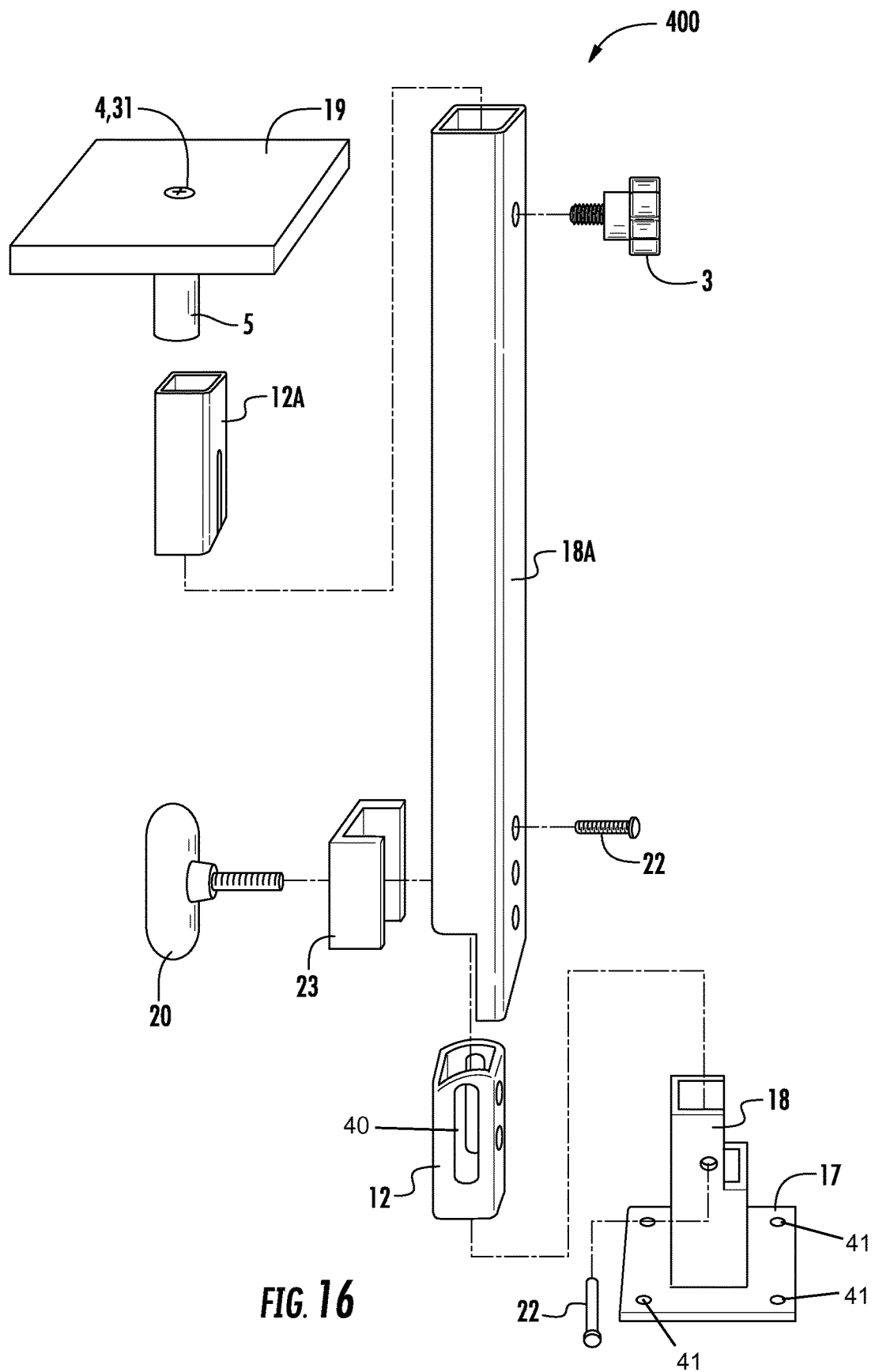
FIG. 16 shows an exploded view of the fourth embodiment of the present invention.
Figures 17, 18:
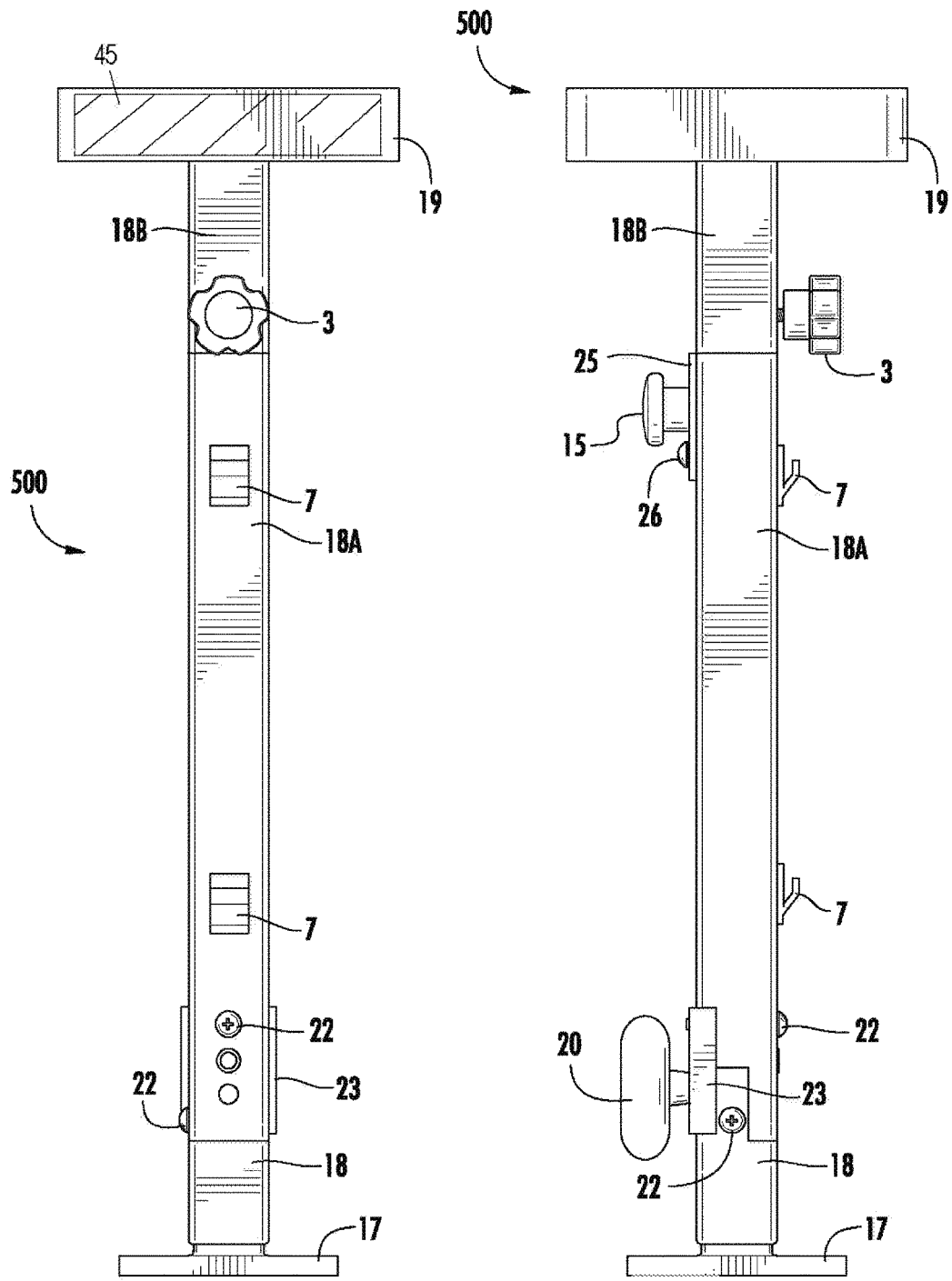
FIG. 17 shows a front view of a fifth embodiment of the present invention.
FIG. 18 shows a side view of the fifth embodiment of the present invention.
Figure 19:
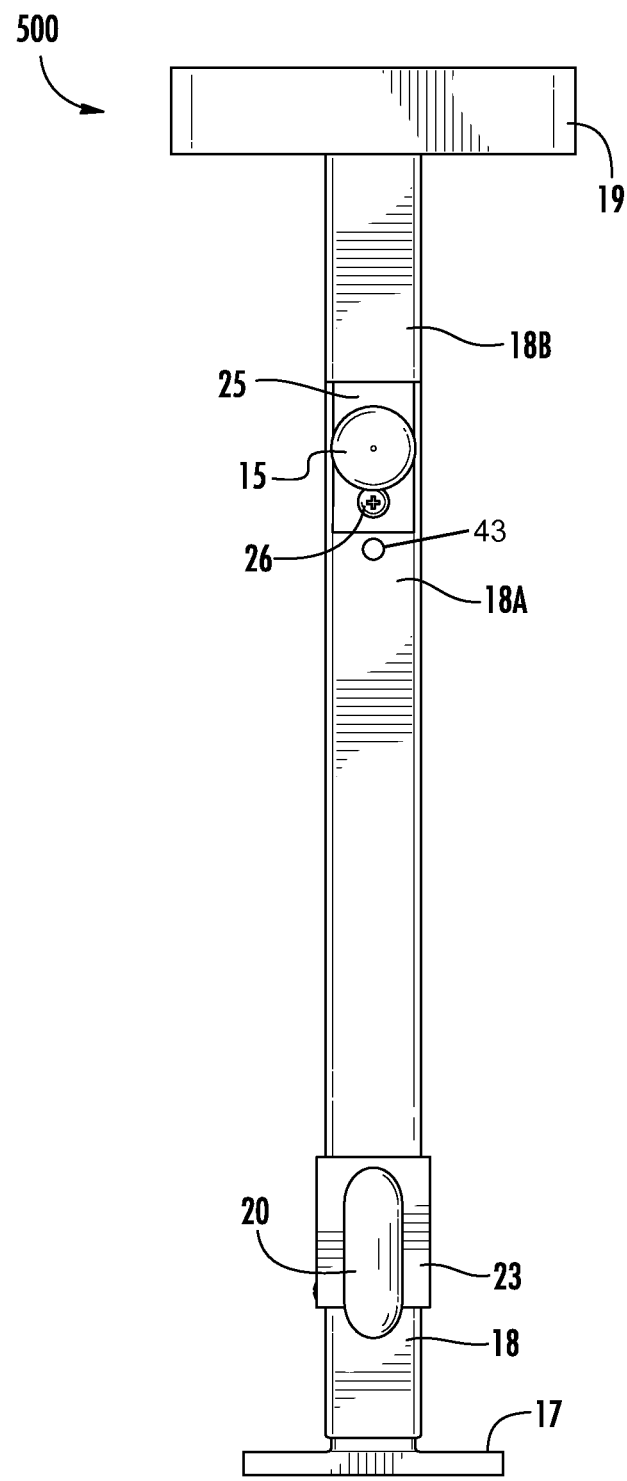
FIG. 19 shows a back view of the fifth embodiment of the present invention.
Figure 20:
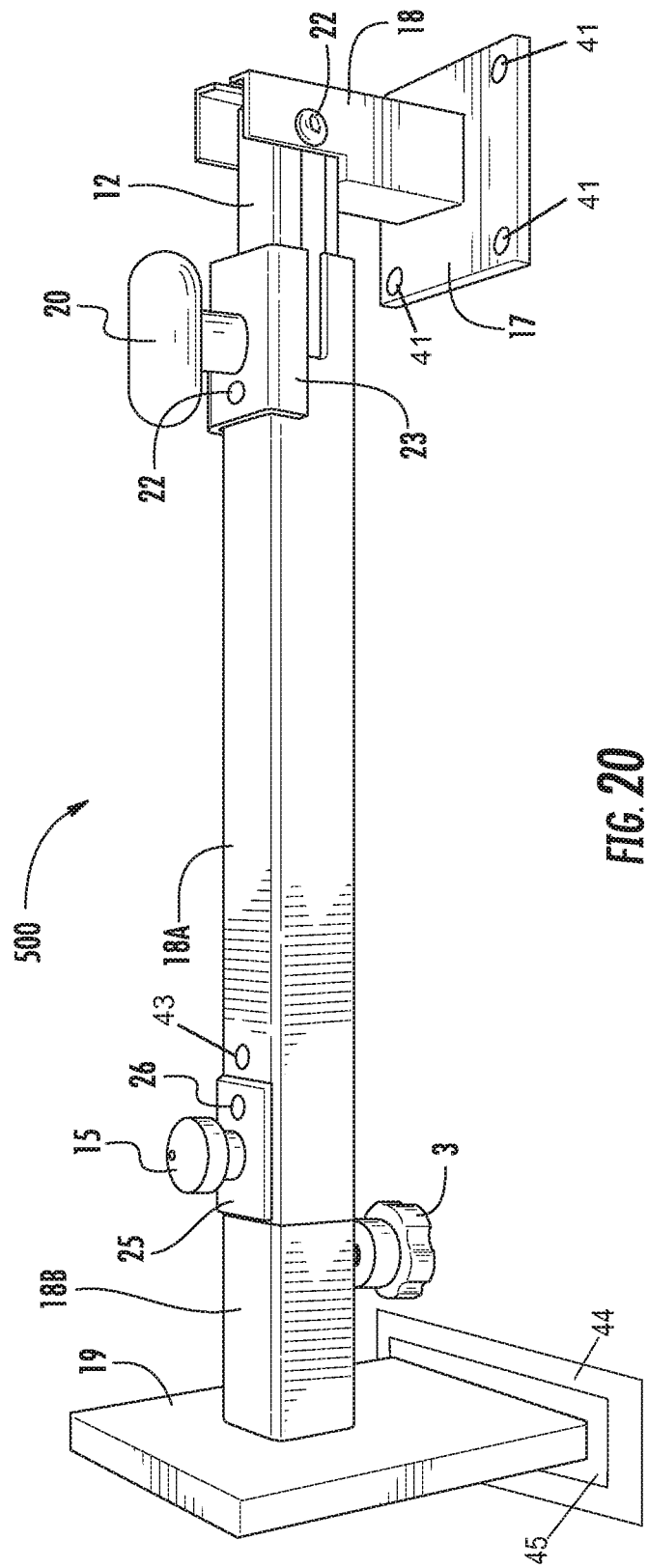
FIG. 20 shows a folded view of the fifth embodiment of the present invention.
Figure 21:
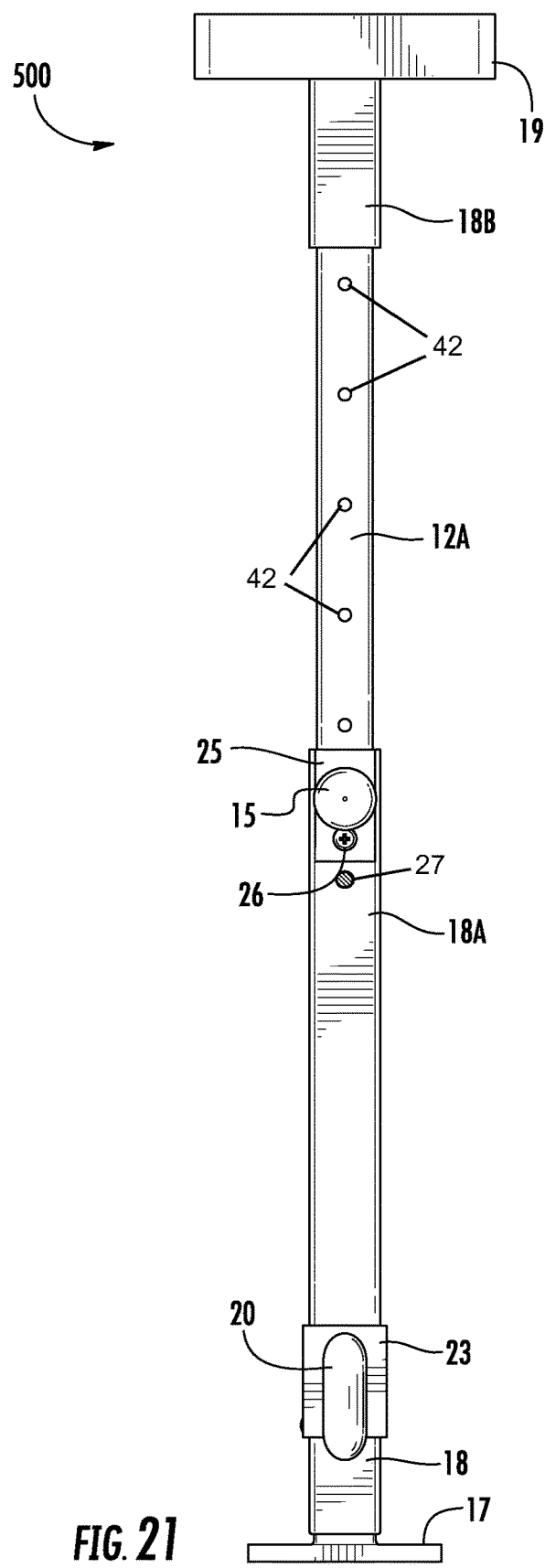
FIG. 21 shows a back view of the fifth embodiment of the present invention in a raised position and showing bushing.

Tubing 12 can preferably be ³¹⁄₃₂"-1", preferably 1", wide, ³¹⁄₃₂"-1", preferably 1", long, 0.075"-⅛", preferably 0.075", thick, and about 3" in height. Cut out 40 in tubing 12 can be about ⁹⁄₃₂" wide and about 1¾" long. Tubing 12 can be curved at one end portion and can curve at about ⁵⁄₁₆" from the end portion as seen in the figures. Inner tubing 12A can preferably be ³¹⁄₃₂"-1", preferably 1", wide, ³¹⁄₃₂"-1", preferably 1", long, 0.075"-⅛", preferably 0.075", thick, and 2½" in height. Inner tubing 12A can be attached to rod 5 with knob 3. Tubing 18 can preferably be 1¼" wide, 1¼" long, 0.115"-⅛", preferably 0.115", thick and 3"-3", preferably 3¾", in height. Tubing 18 can have a top portion with a cut out section (seen in FIG. 16) that is about ⅞" wide and 1¼" long, and can have a U-shaped cut out at the top that can be about ⁷⁄₁₆" wide and ½" long. Tubing 12 can be spot tacked to tubing 18 through a hole, instead of inserting binding post 22 in cut out 40. Also, tubing 12 can optionally be extruded with tubing 18. Tubing 18A can preferably be 1¼" wide, 1¼" long, 0.115"-⅛", preferably 0.115", thick, and 7¼"-17¼", preferably 14½", in height. A cut out can be made at the lower end portion of tubing 18A, and can be cut about 1⅜" long from the lower end portion and about ⅞" in from the side of tune 18A, as seen in FIG. 16. Knob 20 can preferably be a studded knob and can preferably be ⅜" wide and 1½" long. Plate 17 can preferably be 2½"-3", preferably 2½", wide, 2½"-3", preferably 2½", long, and ³⁄₁₆" in height. Plate 17 can be welded to tubing 18. Holes 41 in plate 17 can preferably be ¼" wide and located near the corners of the plate. Holes 41 can be located about ⅜" from the peripheral portion of the plate 17. Plate can also be welded to the boat deck. Binding post 22 can preferably be ¼" wide and 1¼"-1½", preferably 1¼", long. Tubing 23 can preferably be 1½" wide, ⅛" thick and 2-3", preferably 2¼", in height. Sides of tubing 23 can be ⁷⁄₁₆" long. Tubing 23 can be attached to tubing 18A with a binding post 22. Binding post 22 can be replaced with spot tacking through a hole and attached tubing 23 to tubing 18A. Tubing 23 can optionally be extruded into one piece with tubing 18A and tubing 12. Optionally, the following parts can be extruded together: tubing 12A, tubing 18A, tubing 12 and tubing 23.

Optionally, a flat bar and a hook and loop fastener can be included on marine board 19 to hold the stand to the boat deck in the folded position. Optionally, flat bar can preferably be ¾" wide, 5" long, and ⅛" thick. Optionally, hook and loop fastener can preferably be made of Velcro. Optionally, hook and loop fastener and flat bar can be replaced with a strap that secures the stand to the deck.

Marine board 19 can preferably be 3¾"-4", preferably 4", wide, 5" long, and ¾" thick. Rod 5 can be attached to marine board 19 with screws 4. Hole 30 with screw 4 and washer 31 can be located about 2" from the back side of board 19 and about 2" from the right or left side of board 19. GPS/sonar unit can be attached to marine board 19 with screws 4 or another securing means. The combination of rod 5 and marine board 19 can be inserted into base tubing 12A, 18A, and can rotate 360 degrees and held in place with knob 3.

Optionally, a flat bar can be attached to a boat deck with screws. Optionally, hook and loop fastener can be glued on the front side of marine board 19 and on the top of flat bar. Optionally, hook and loop fastener and flat bar can be replaced with a strap that attaches to the deck.

Assembly of Tournament Model:
1. Plate 17 is welded or attached to tubing 18 (Assembly 1).
2. Tubing 12 is attached to tubing 18 with binding post 22 in cut out 40 (Assembly 2).
3. The other end of tubing 12 is attached to tubing 18A with tubing 23 and with binding post 22 (Assembly 3).
4. Tubing 23 is attached to tubing 18A with binding post 22 (Assembly 4).
5. The combination of Assembly 2, 3, 4 is held in place to Assembly 1 with knob 20, which connects to tubing 23, tubing 12, tubing 18A and tubing 18.
6. Tubing 12A is inserted into the top of tubing 18A and held in place with knob 3.
7. Marine board 19 is attached to rod 5 with screw 4 and washer 31 (Assembly 7).
8. Assembly 7 is inserted into tubing 12A and tubing 18A and held in place by knob 3.
9. Electrical ties 7 to hold the GPS/sonar device wires can be included on tubing 18A.
10. Optionally, a hook and loop fastener and flat bar, or strap can be used to secure the stand to the deck.

Operation of Tournament Model

In an upright position, knob 3 can be operated to be turned to allow the GPS/sonar unit to rotate 360 degrees or for easy removal from the tubing for storage.

Stand 400 can fold down to a boat deck by releasing knob 20 and pulling up on the GPS/sonar unit about 1" to clear tubing 18 and fold forward to the deck. Optionally, the stand is held in place in the folded position with hook and loop fastener attached to the marine board 19 of stand 400 and hook and loop fastener attached to a flat bar that is attached to the boat deck. Optionally, a strap can be used to secure the stand in a folded position to the boat deck.

V. Pro Model

A fifth embodiment 500 of the present invention is seen in FIGS. 17-22 and discloses a stand that can telescope from 20" to 30". Stand 500 can fold down to 5" in height on the deck of a boat during nonuse or high speed traveling. Marine board 19 can be easily mounted to the stand with screws, rotates 360 degrees with knob 3 and is easily removed for storage.

Figure 22:
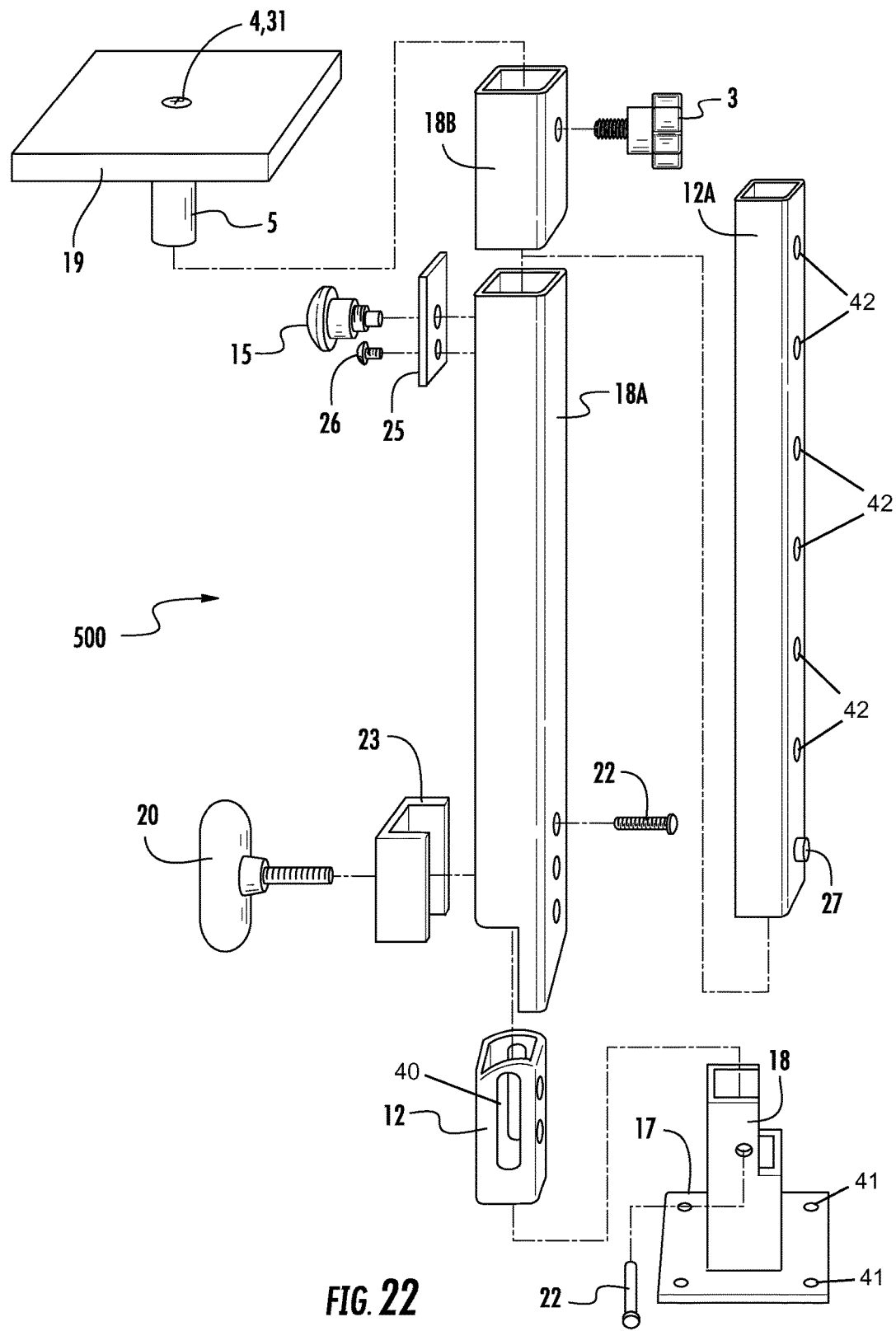
FIG. 22 shows an exploded view of the fifth embodiment of the present invention.

Marine board 19 can be 3¾"-4", preferably 4", wide, 5" long, and ¾" in height. Tubing 12 can preferably be ³¹⁄₃₂"-1", preferably 1", wide, ³¹⁄₃₂"-1", preferably 1", long, 0.75"-⅛", preferably 0.75", thick, and 3"-3¾", preferably 3", in height. Cut out 40 in tubing 12 can be about ⁹⁄₃₂" wide and about 1¾" long. Tubing 12 can be curved at one end portion and can curve at about ⁵⁄₁₆" from the end portion as seen in FIG. 22. Inner tubing 12A can preferably be ³¹⁄₃₂"-1", preferably 1", wide, ³¹⁄₃₂"-1", preferably 1", long, 0.075"-⅛", preferably 0.075", thick, and 15"-15¼", preferably 15", in height. Inner tubing 12A has multiple holes 42 on the front and the back of the tube. On one side, there are a plurality of adjustment holes 42 (see FIG. 21), with each hole located about 1"-2" apart and allowing for the stand 500 to be raised or lowered according to the height of the adjustment hole 42. On the opposite side of tube 12A there can be two holes, one hole located near the upper end portion of tube 12A and another hole located near the lower end portion of tube 12A, so that the tube can be adjusted to a highest point or to a lowest point. Inner tubing 12A can be attached to tubing 18A and raised and lowered in height with plunger 15. Both sides of tubing 12A can be used with plunger 15. Tubing 18 can preferably be 1¼" wide, 1¼" long, 0.115"-⅛", preferably 0.115", thick and 3"-3¾" in height. Tubing 18 can have a top portion with a cut out that is about ⅞" wide and 1¼" long, and can have a U-shaped cut out at the top that can be about ⁷⁄₁₆" wide and ½" long. Tubing 18A can preferably be 1¼" wide, 1¼" long, 0.115"-⅛", preferably 0.115", thick, and 14½"-15¼", preferably 14½", in height. A cut out can be made in the lower end portion of tubing 18A, and can be about 1⅜" from the end portion and about ⅞" from the side, as seen in the figures. Tubing 12 can be attached to tubing 18 and tubing 18A with binding posts 22. Tubing 12 can be spot tacked to tubing 18 through a hole instead of using post 22. Optionally, tubing 12 can be extruded with tubing 18A. Tubing 18B can preferably be 1¼" wide, 1¼" long, 0.115"-⅛", preferably 0.115", thick, and 2½" in height. Tubing 18B can be attached to tubing 12A with knob 3, which also secures rod 5 with board 19. Tubing 18B with knob 3 can be used on the front or back of the apparatus 500. Flat bar 25 can be 1¼" wide, 1½" long, and ⅛" thick. Bar 25 can be attached to tubing 18A with lock washer 26. Optionally, the following parts can be extruded together: tubing 18A, tubing 12, tubing 23, and bar 25. A quick release button 27 can be included on sides of tube 12A and connected to a hole 43 below lock washer 26 to keep from pulling tubing 12A out of tubing 18A.

Knob 20 can preferably be a studded knob and can preferably be ⅜" wide and 1½" long. Plate 17 can preferably be 2½"-3", preferably 2½", wide, 2½"-3", preferably 2½", long, and ³⁄₁₆" in height. Plate 17 can be welded to tubing 18. Holes 41 can be located about ⅜" from the peripheral portion of the plate 17. Optionally, plate 17 can be welded to the boat deck. Binding post 22 can preferably be ¼" wide and 1¼"-1½" long. Tubing 23 can be 1½" wide, ⅛"-½", preferably ⅛", thick, and 2-3", preferably 2¼", in height. Sides of tubing 23 can be 7/16" long. Tubing 23 can be attached to tubing 18A with a binding post 22. Binding post 22 can be replaced with spot tacking through a hole and attached tubing 23 to tubing 18A. Tubing 23 can optionally be extruded into one piece with tubing 18A and tubing 12.

Optionally, a flat bar and a hook and loop fastener can be included on marine board 19 to hold the stand to the boat deck in the folded position. Optionally, flat bar can preferably be 3/4" wide, 5" long, and 1/8" thick. Optionally, hook and loop fastener can preferably be made of Velcro. Optionally, hook and loop fastener and flat bar can be replaced with a strap that secures the stand to the deck.

Mini indexing plunger 15 can preferably be 3/8" wide.

Knob 3 can be a studded knob and can preferably be 1/4" wide and 1/2" long. Rod 5 can preferably be 23/32"-13/16", preferably 13/16", wide and 2"-3", preferably 3", long. Hole 30 is located in rod 5 and can preferably have 1/4" threads and can be 1" long. Screw 4 can preferably be 1/4" wide and 1 1/4" long, and can be a pan head machine screw. Washer 31 can preferably be 1/4" wide and can be adjoined with screw 4. Hole 30 with screw 4 and washer 31 can be located about 2" from the back side of board 19 and about 2" from the right or left side of board 19.

Assembly of Pro Model:
1. Plate 17 is welded or attached in some manner to tubing 18 (Assembly 1).
2. Tubing 12 is attached to tubing 18 with binding post 22 in cute out 40 (Assembly 2).
3. The other end of tubing 12 is attached to tubing 18A and 23 with binding post 22 (Assembly 3).
4. Tubing 23 is attached to tubing 18A with binding post 22 (Assembly 4).
5. The combination of Assembly 2, 3, 4 is held in place to Assembly 1 with knob 20 which connects to tubes 23, 12, 18A, 18.
6. Tubing 12A is attached to tubing 18B with knob 3 (Assembly 6).
7. Marine board 19 is attached to rod 5 with screw 4 and washer 4A (Assembly 7).
8. Assembly 6 is put into tubing 18A and held in place by spring plunger 15.
9. Assembly 7 is put into tubing 12A and held in place with knob 3.
10. Electrical ties 7 can be used to hold the GPS/sonar device wires on tubing 18A.

Operation of Pro Model

In an upright position, stand 500 can telescope up by pulling spring plunger 15 and lifting up on Assembly 7. Stand 500 can be adjusted over 2" from 20" to 30". By releasing spring plunger 15, stand 500 will lock at a desired height (see FIG. 21). A GPS/sonar unit can be mounted on marine board 19 and can rotate 360 degrees and can be locked in position with knob 3. The GPS/sonar unit can be easily removed by releasing knob 3.

Stand 500 can fold down to a boat deck by releasing knob 20 and pulling up about 1" to clear tubing 18. Stand 500 can fold down to deck (see FIG. 20). Optionally stand can be held in place in the folded position with hook and loop fastener attached to the marine board 19 of stand 400 and hook and loop fastener attached to a flat bar that is attached to the boat deck. Optionally, a strap can be used to hold stand 500 to deck.

PARTS LIST

The following is a list of suitable parts and materials for the various elements of the preferred embodiment of the present invention.

| Parts Number | Description |
| --- | --- |
| 2 | outer tubing |
| 3 | knob |
| 4 | screw |
| 4A | lock washer |
| 5 | rod |
| 6 | marine board |
| 7 | electrical/cable tie holder (to hold GPS/sonar wires) |
| 8 | inner tubing |
| 10 | release pin |
| 11 | lanyard |
| 12 | tubing |
| 12A | tubing |
| 15 | mini indexing plunger |
| 17 | base plate |
| 18 | tubing |
| 18A | tubing |
| 18B | tubing |
| 19 | marine board |
| 20 | knob |
| 22 | binding post |
| 23 | tubing/plate |
| 25 | bar |
| 26 | lock washer |
| 27 | quick-release button |
| 30 | hole |
| 31 | washer |
| 32 | base tubing |
| 36 | hole |
| 37 | hole |
| 38 | hole |
| 39 | hole |
| 40 | cut out |
| 41 | hole |
| 42 | hole |
| 43 | hole |
| 44 | flat bar |
| 45 | hook and loop fastener |
| 100 | Console model apparatus |
| 200 | Fisherman model apparatus |
| 300 | Sportsman model apparatus |
| 400 | Tournament model apparatus |
| 500 | Pro Model apparatus |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A folding stand apparatus for mounting a Global Positioning System (GPS)/sonar device on a boat, comprising:
   a) a first tubing positionally secured to a deck of a boat and having a top end portion comprising a first mating surface;
   b) an upper body attached to the first tubing and being transitionable between a first raised position wherein the upper body is positionally secured to the first tubing and generally perpendicular to the deck, a second folded position where the upper body is generally parallel to the deck, and a third position where the upper body is positionally unlocked and transitionable to either the first or second positions, comprising:
   a second tubing having a top and a lower end portion having a second mating surface, wherein the second mating surface fits on the first mating surface when the upper body is in the first position;
   inner tubing sized to fit within the first and second tubing, wherein in the first position, at least a portion of the inner tubing is within the first tubing below the top end portion such that rotation of the upper body is prevented, and wherein in either the second or third positions, the inner tubing is positioned relative to the top end portion such that rotation of the upper body between the second and third positions is allowed; and c) a top support removably secured to the upper body in a position above the top of the second tubing.

2. The apparatus of claim 1, further comprising a plate sized to receive a portion of either the first or second tubing wherein the plate receives the first and second tubing portions in the first position and receives the second tubing portion in either the second or third position.

3. The apparatus of claim 2, further comprising a first hook and loop fastener located on a front side of the top support and a second hook and loop fastener located on the deck, wherein the first fastener and second fastener adhere when the apparatus is in a folded position.

4. The apparatus of claim 1, wherein the top support is secured to the top of the second tubing by a rod and a knob.

5. The apparatus of claim 1, wherein the apparatus is about 20" in height.

6. The apparatus of claim 4, wherein the top support can be removed by releasing the knob.

7. The apparatus of claim 4, wherein the top support is rotatable about 360 degrees by operation of the knob.

8. The apparatus of claim 1, wherein the top support is made of polyethylene plastic.

9. The apparatus of claim 1, wherein at least one of the tubings is made of aluminum.

10. The apparatus of claim 1, further comprising multiple electrical tie holders on the upper body and used to secure wires of the GPS/sonar device.

11. A folding and telescoping stand apparatus for mounting a Global Positioning System (GPS)/sonar device on a boat, comprising:

a) a first outer tubing positionally secured to a deck of a boat and having a top end portion with a first mating surface;

b) an upper body, attached to the first outer tubing and being transitionable between a first raised position wherein the upper body is positionally secured to the first outer tubing and generally perpendicular to the deck, a second folded position where the upper body is generally parallel to the deck, and a third position where the upper body is positionally unlocked and transitionable to either the first or second positions, comprising:

a second outer tubing having a top and a lower end portion with a second mating surface, where the second mating surface fits on the first mating surface when the upper body is in the first position;

a first inner tubing sized to fit within the first and second outer tubing, wherein in the first position, at least a portion of the first inner tubing is within the first outer tubing below the top end portion such that rotation of the upper body is prevented, and wherein in either the second or third positions, the first inner tubing is positioned relative to the top end portion such that rotation of the upper body between the second and third positions is allowed; and a second inner tubing placed and movable within the second outer tubing, and having a plurality of longitudinally spaced adjustment holes; and c) a board removably secured to the upper body in a position above the top of the second inner tubing.

12. The apparatus of claim 11, wherein the adjustment holes enable the second inner tubing to be moved relative to the second outer tubing.

13. The apparatus of claim 12, further comprising a button on the second inner tubing that prevents the second inner tubing from being completely removed from within the second outer tubing.

14. The apparatus of claim 11, wherein the board is secured to the top of the second inner tubing by a rod and a knob.

15. The apparatus of claim 14, wherein the board can be removed by releasing the knob.

16. The apparatus of claim 14, wherein the board is rotatable about 360 degrees by operation of the knob.

17. The apparatus of claim 11, wherein at least one of the tubings is made of aluminum.

18. The apparatus of claim 11, further comprising a top tube sized to receive the top portion of the second inner tubing.

19. The apparatus of claim 11, wherein the apparatus has a height ranging approximately from 20" to 30" in height.

20. The apparatus of claim 11, further comprising a plate sized to receive a portion of either the first outer or second outer tubing wherein the plate receives the first outer and second outer tubing portions in the first position and receives the second outer tubing portion in either the second or third position.

* * * * *